United States Patent
Kalogeropoulus et al.

(10) Patent No.: US 6,229,283 B1
(45) Date of Patent: May 8, 2001

(54) VOLTAGE/CURRENT REGULATOR AND METHOD FOR BATTERY CHARGING

(75) Inventors: Sarandis Kalogeropoulus, Malmö; Johan Mercke, Lund; Heino Wendelrup; Magnus Hansson, both of Malmö; Rickard Andersson; Charles Forsberg, both of Helsingborg, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/543,898

(22) Filed: Apr. 6, 2000

(30) Foreign Application Priority Data

Apr. 14, 1999 (SE) .................................................. 9901333
Oct. 13, 1999 (SE) .................................................. 9903672

(51) Int. Cl.[7] .......................... H01M 10/44; H01M 10/46
(52) U.S. Cl. ............................................................ 320/125
(58) Field of Search .................................... 320/132, 134, 320/135, 136, 160, 125

(56) References Cited

U.S. PATENT DOCUMENTS

| | | | |
|---|---|---|---|
| 3,979,658 | * | 9/1976 | Foster . |
| 4,341,988 | * | 7/1982 | Small . |
| 4,644,247 | * | 2/1987 | Burmenko . |
| 5,576,609 | | 11/1996 | Brown . |
| 5,703,470 | | 12/1997 | Baranowski et al. . |

* cited by examiner

Primary Examiner—E. Tso
(74) Attorney, Agent, or Firm—Nixon & Vanderhye P.C.

(57) ABSTRACT

A voltage/current regulator regulates charging of a rechargeable battery in a portable apparatus that includes a transistor and a controller means coupled to the transistor for controlling the charging current to the battery. The controller determines the power dissipation in the transistor of the regulator. If the power dissipation is above a maximum allowed power dissipation, the controller decreases the charging current by a particular current step. Otherwise, the controller determines if the power dissipation will exceed the maximum allowed power dissipation if the charging current is increased by the current step. If not, the controller increases the charging current by the current step.

20 Claims, 2 Drawing Sheets

VOLTAGE/CURRENT REGULATOR AND METHOD FOR BATTERY CHARGING

The present invention relates generally to a voltage/current regulator and a method for regulating the charging of a rechargeable battery in a portable electronic apparatus.

Rechargeable batteries, when in a charged condition, are used to provide electric current to power a variety of electrical appliances, such as industrial and consumer applications, including mobile telephone apparatuses or other similar electronic devices. However, when the battery is discharged, it needs to be charged. Battery charging implies generally applying of an appropriate electric current to the battery for a certain time.

The charging current required depends on which type of rechargeable cells or batteries are used, and with some types of rechargeable batteries the value of the current has to be varied during the charging process. Therefore a charging programme are used in order to regulate the current during the charging.

Lithium - or Li batteries are commonly used batteries in the above mentioned appliances because of its light weight, high-voltage, high energy density, flat discharge characteristics, and long shelf life etc. However, in some stages in the charging cycle of Li-batteries it is required to have a linear regulation of the charging current. Therefore, a transistor is used for controlling the current and during the regulation it has a voltage drop from the drain to the source. Hence, heat is generated in the transistor and power is dissipated.

Due to the cost and board space limitation reasons it is desired to use a transistor which is as small as possible. However, a small transistor can handle less amount of power dissipation. Consequently, the current must be set low in order to cover all cases regarding to the temperature, the voltage level and the charging current. This means, however, that in many cases the current is unnecessarily low, resulting in longer charging times.

Another alternative is to apply a higher current in order to reduce the charging time for normal cases. However, in some cases the current is too high, resulting in a high temperature in the transistor and in the phone that in some cases irritates the user of the phone and also reduce the lifetime of the transistors.

SUMMARY

Therefore, it is an object of the present invention to provide a voltage/current regulator and method for battery charging in a portable apparatus which overcomes the above-mentioned problems.

This is accomplished with a voltage/current regulator apparatus according to the invention, which is regulated to dissipate a constant power, wherein a maximum allowed current regarding to power dissipation and temperature in the apparatus is used in the charging current transistor in the apparatus.

An advantage of the present invention is that the charging current is dynamically adjusted to the actual incoming voltage and the temperature inside the phone and the battery. Consequently, the minimum charging time is always achieved although the maximum dissipation is never exceeded.

Further, there is no inconvenient temperature increasing in the phone, which is important particularly regarding to very compact phone designs, in which even a small increase in temperature in the phone is noticeable by the user. In general it is an advantage of the present invention to keep the increase in temperature due to the charging as low as possible.

BRIEF DESCRIPTION OF THE DRAWING

In order to explain the invention in more detail and the advantages and the features of the invention references in the following detailed description of the preferred embodiment are made to the accompanying drawings, in which.

DETAILED DESCRIPTION OF THE INVENTION

Figure 1:
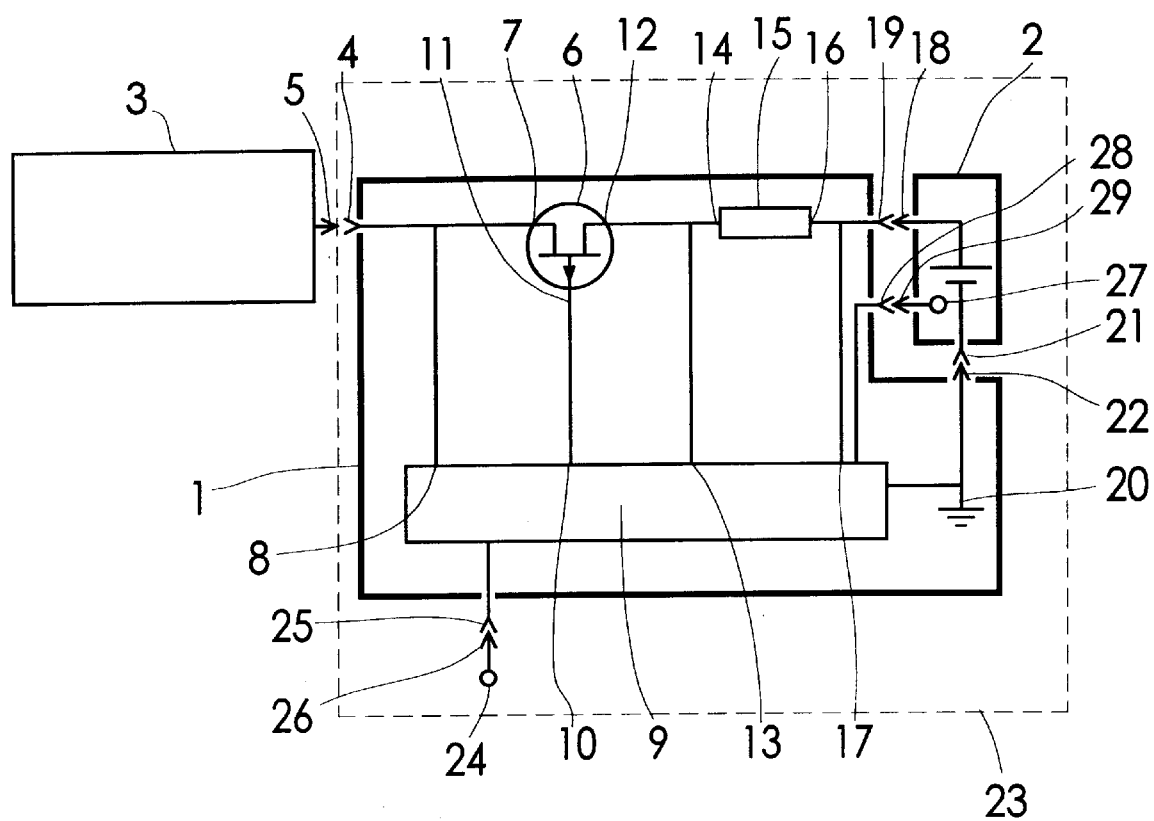
FIG. 1 is an illustrative block diagram of a charging environment including the voltage/current regulator according to the invention.

Referring to FIG. 1, a voltage/current regulator 1 according to the invention is connected to a rechargeable battery pack 2 to be charged and to an external charger 3.

The voltage/current regulator 1 comprises a first terminal 4 intended for connection to a corresponding first terminal 5 of the charger 3.

Further, the regulator 1 comprises a transistor 6 for controlling the charging current. The source 7 of the transistor, having a source voltage DCIO, is connected to a first terminal 8 of a controller means 9 for the charge regulation and to the terminal 4. A second terminal 10 of the controller means 9 is connected to the gate 11 of the transistor 6. The drain 12 of the transistor, having a drain voltage VBAT, is connected to a third terminal 13 of the controller means 9 and a first terminal 14 of an impedance 15. A second terminal 16 of the impedance is connected to a fourth terminal 17 of the controller means 9 and to a first terminal 18 of the battery 2 via a second terminal 19 of the regulator 1. The battery 2 is also connected to ground 20 via its second terminal 21 and a third terminal 22 of the regulator 1.

The controller means 9 has access to three parameters in order to control the power dissipation: 1. DCIO, which is the source voltage 7; 2. VBAT, which is the drain voltage 12; and 3. Icharge, which is the charging current through the transistor into the battery pack 2.

In a method according to the invention the controller means 9 determines the momentary power dissipation, Pdiss, in the transistor 6 by:

$$Pdiss = Icharge(DCIO - VBAT)$$

in step 201.

Pmax is the maximum allowed Pdiss. If Pdiss is above Pmax is checked in step 202 and, if so, Icharge is decreased by Istep in step 203, wherein Istep is the increment/decrement value of Icharge.

If Pdiss is determined to be below Pmax in step 202, there are two alternatives available, either Icharge is increased by Istep or it is unchanged.

A temporary parameter NewPdiss is assigned (Icharge+Istep)(DCIO−VBAT) in step 203'. Then, if NewPdiss<Pmax is checked in step 204 and, if so, the first alternative is performed in step 205, i.e Icharge is increased by Istep, otherwise Icharge is unchanged.

However, if Icharge had been increased by Istep in the last case, Pmax would have been exceeded.

Again referring to FIG. 1, the regulator 1 is provided in an electronic apparatus 23, such as a mobile telephone, a personal organizer, handheld computer or another similar battery supplied apparatus. When determining Pmax, also the temperature in the apparatus 23 and in the battery 2 is taken into consideration. The temperature is detected by temperature sensor means connected to the controller means 9. First sensor means 24 is provided in the apparatus 23 in order to detect the temperature in the apparatus and is connected to a fifth terminal 25 of the regulator 1 via a terminal 26, for transmitting a corresponding temperature signal to the controller means 9.

Figure 2:
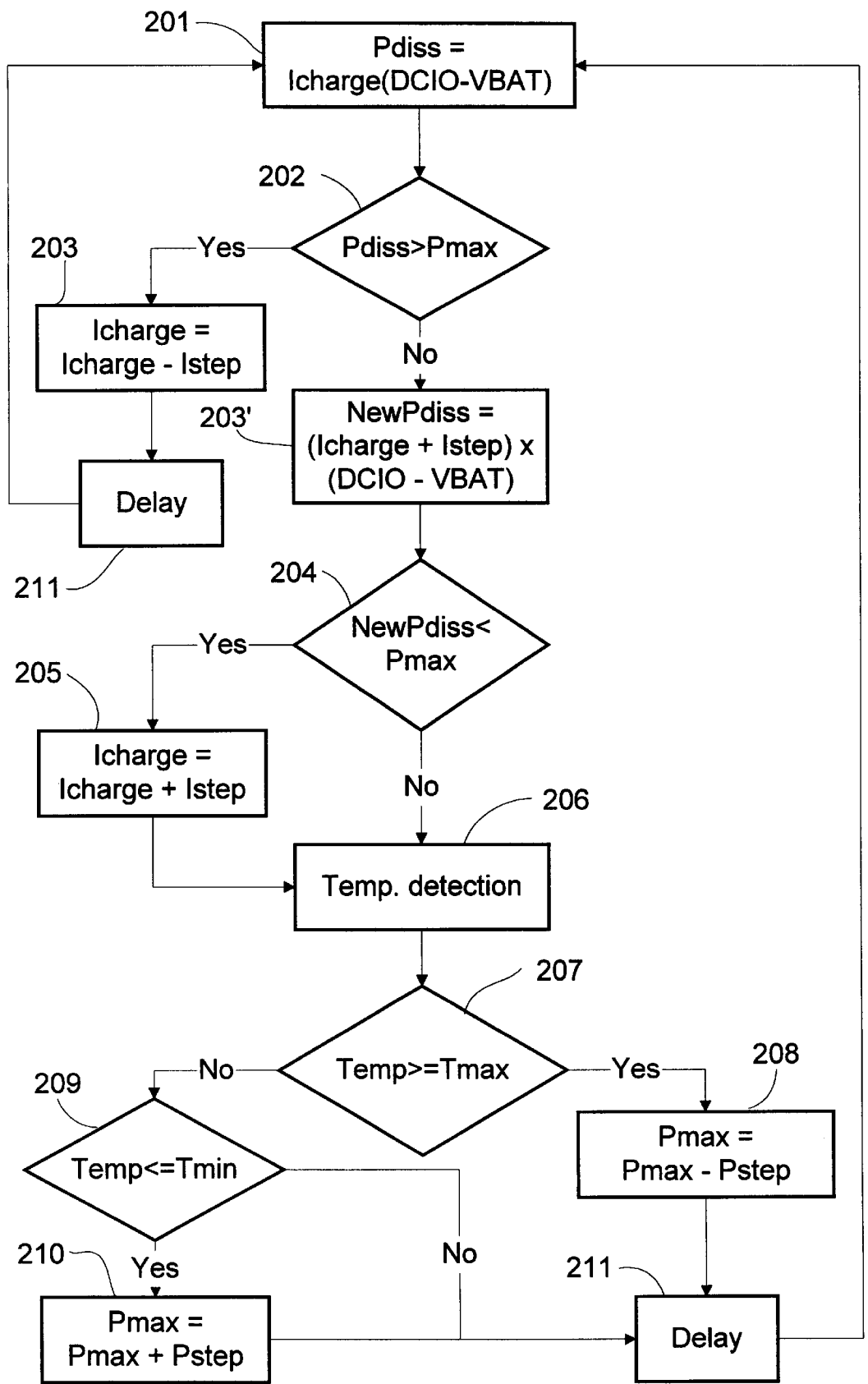
FIG. 2 is flow chart illustrating an embodiment of a method for voltage/current regulation according to the invention.

Second sensor means 27 is provided in connection with the battery 2 in order to detect the battery temperature. The sensor means 27 is connected, via a third terminal 29 of the battery, to a fifth terminal 28 of the regulator 1, which is connected to the controller means 9 for transmitting a corresponding temperature signal. A temperature level in the apparatus 23 or the battery 2 or both, which is considered to be almost to high by the user, is set to be a high temperature limit Tmax. Hence, when the temperature exceeds Tmax the charging current Icharge has to be decreased. According to the method of the invention illustrated in FIG. 2, the temperature in the apparatus 23 ATemp and/or in the battery 2 BTemp are detected in step 206. Then, if the temperature Temp (Temp=max[ATemp,BTemp) is higher than or equal to Tmax, which is checked in step 207, Pmax is decreased by a particular value Pstep, in step 208, in order to decrease the heat release in the apparatus.

In another case the temperature is quite low and the user is satisfied. When the temperature drops below another value Tmin, which is set to be the low temperature limit, a higher Pmax is acceptable and, thus, Pmax can be increased. Hence, if the temperature is determined to be well below the high limit in step 207 the process proceeds to step 209, in which it is determined if the temperature is lower than or equal to Tmin. If so, the Pmax is increased by Pstep, in step 210. Consequently, the maximum allowed power dissipation is adjusted regarding to the temperature in the apparatus.

The regulation process, including the temperature detection, source and drain voltage measurements, and the required adjustment of the current are performed at specified time intervals controlled by a timer in the controller means 9. No current adjustments are performed within the time interval that ensures that changes in the charging current are performed with a controlled maximum frequency. This is implemented by a timer delay in step 211 in this embodiment of the invention.

Even though characteristics and advantages of the present invention have been set forth in the foregoing description it is to be understood that the disclosure is illustrative only, and changes may be made in detail within the principles of the invention indicated by the broad general meaning of the claims.

For example, in an alternative embodiment of the invention only one temperature means is provided for the temperature measurement in the apparatus.

What is claimed is:

1. A voltage/current regulator for regulating charging of a rechargeable battery in a portable apparatus comprising a transistor and controller means coupled to said transistor for controlling the charging current to said battery, wherein in that said controller means is capable of:

determining the power dissipation in the transistor of the regulator, determining if the power dissipation is above a maximum allowed power dissipation, if so, decreasing the charging current by a particular current step, if not, determining if the power dissipation will exceed the maximum allowed power dissipation if the charging current is increased by the current step, and if not, increasing the charging current by the current step.

2. A voltage/current regulator according to claim 1, wherein said controller means is capable of:

detecting the temperature in the apparatus and/or the battery, determining if the temperature is higher than or equal to a predetermined maximum allowed temperature limit, if so, decreasing the maximum allowed power dissipation by a particular power step, in order to decrease the heat release in the apparatus, if not, determining if the temperature is lower than or equal to a predetermined minimum temperature limit, and if so, increasing the maximum allowed power dissipation by the power step.

3. A portable communication apparatus according to claim 2, wherein the dynamic menu comprises at least one prestored menu item provided by a manufacturer before first use of the portable communication apparatus.

4. A portable communication apparatus according to claim 2, wherein the apparatus is a mobile telephone.

5. A battery supplied electronic apparatus, comprising means for regulating charging of a rechargeable battery, wherein said means for regulating charging is a voltage/current regulator according to claim 1.

6. A battery supplied electronic apparatus according to claim 5, wherein temperature sensor means provided in the apparatus and connected to the controller means, for detecting the temperature in the apparatus and transmitting a corresponding temperature indicating signal to the controller means.

7. A portable communication apparatus as in claim 6, wherein the controller is arranged, when providing said function for modifying the dynamic menu, to provide a function for allowing a user to decide a sequential position of any menu item of the dynamic menu.

8. A portable communication apparatus according to claim 6, wherein the dynamic menu comprises at least one prestored menu item provided by a manufacturer before first use of the portable communication apparatus.

9. A portable communication apparatus according to claim 6, wherein the apparatus is a mobile telephone.

10. A battery for use with the electronic apparatus as claimed in claim 5 wherein the battery includes temperature sensor means for indicating the temperature of the battery, and a terminal coupled to the sensor means and connected to the controller means for transmitting a corresponding temperature signal to the controller means.

11. A portable communication apparatus according to claim 10, wherein the dynamic menu comprises at least one prestored menu item provided by a manufacturer before first use of the portable communication apparatus.

12. A portable communication apparatus according to claim 10, wherein the apparatus is a mobile telephone.

13. A portable communication apparatus as in claim 5, wherein the controller is arranged, when providing said function for modifying the dynamic menu, to present a list of menu items on the display, the list comprising menu items already located in the dynamic menu, to accept a selection command through the user-controlled input device and in response delete a selected menu item from the dynamic menu.

14. A portable communication apparatus as in claim 5, wherein the controller is arranged, when providing said function for modifying the dynamic menu, to provide a function for allowing a user to decide a sequential position of any menu item of the dynamic menu.

15. A portable communication apparatus according to claim 5, wherein the dynamic menu comprises at least one prestored menu item provided by a manufacturer before first use of the portable communication apparatus.

16. A portable communication apparatus according to claim 5, wherein the apparatus is a mobile telephone.

17. A method for voltage/current regulation in a voltage/current regulator, comprising a transistor for controlling the charging current of the regulator during charging of a battery in a portable apparatus, wherein the steps of:

determining the power dissipation in the transistor of the regulator, determining if the power dissipation is above a maximum allowed power dissipation, and if so, decreasing the charging current by a particular current step, if not, determining if the power dissipation will exceed the maximum allowed power dissipation if the charging current is increased by the current step, and if not, increasing the charging current by the current step.

18. A method according to claim 17, wherein the further steps of:

detecting the temperature in the apparatus, determining if the temperature is higher than or equal to a predetermined maximum allowed temperature, if so, decreasing the maximum allowed power dissipation by a particular power step, in order to decrease the heat release in the apparatus, if not, determining if the temperature is lower than or equal to a minimum temperature, and if so, increasing the maximum allowed power dissipation by the power step.

19. A method according to claim 17, wherein regulation process, including the temperature detection, source and drain voltage measurements, and the required adjustment of the current are performed at specified time intervals.

20. A portable communication apparatus according to claim 17, wherein the apparatus is a mobile telephone.

\* \* \* \* \*